March 17, 1925.

J. L. IRVIN ET AL 1,529,954

BLOWTORCH ANGLE PIPE CUTTER

Filed May 19, 1923

3 Sheets-Sheet 3

Patented Mar. 17, 1925.

1,529,954

UNITED STATES PATENT OFFICE.

JOHN L. IRVIN AND LEO A. BRAUER, OF BEAUMONT, TEXAS.

BLOWTORCH ANGLE-PIPE CUTTER.

Application filed May 19, 1923. Serial No. 640,062.

*To all whom it may concern:*

Be it known that we, JOHN L. IRVIN and LEO A. BRAUER, citizens of the United States, residing at Beaumont, Jefferson County, Texas, have invented a certain new and useful Improvement in Blowtorch Angle-Pipe Cutters, of which the following is a full, clear, and exact description, such as will enable others skilled in the art to which it appertains to make and use the same.

Our invention relates to an apparatus for holding pipe and for guiding the blow torch in the process of cutting said pipe at an angle to the axis of the pipe.

An object of the invention is to provide an apparatus by means of which a length of pipe may be securely held in rigid position while it is being cut.

It is a further object to provide a guide ring through which the pipe may be placed, which ring may be set at the desired angle relative to the pipe and furnish a guide for a blow torch to be used in the cutting operation.

Another object is to provide a torch holding device by means of which the torch will be held in uniform spaced relation as regards the pipe during the cutting operation, no matter at what angle it is set.

These and other objects and advantages and the means by which the objects are obtained will be better understood from the specification which follows.

Figure 1:
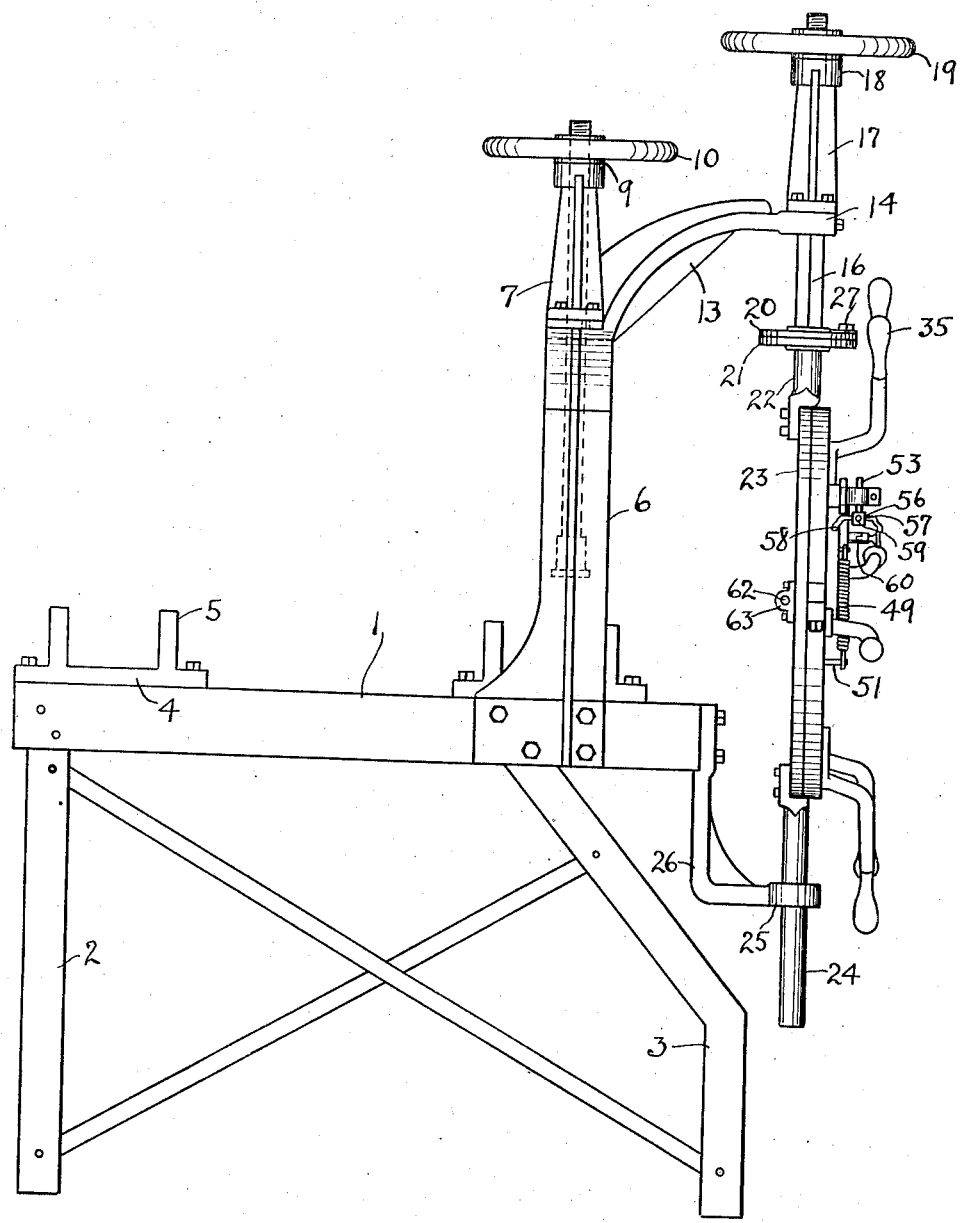
Figure 2:
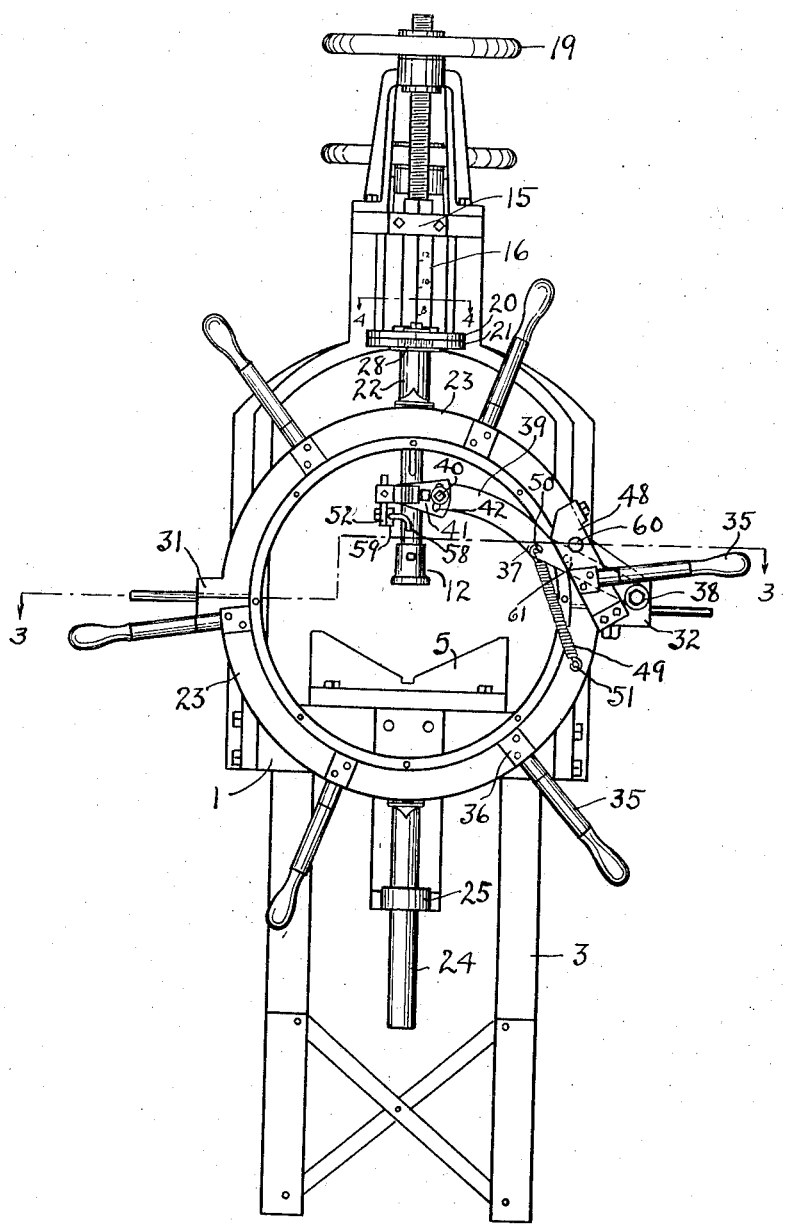
Figure 3:
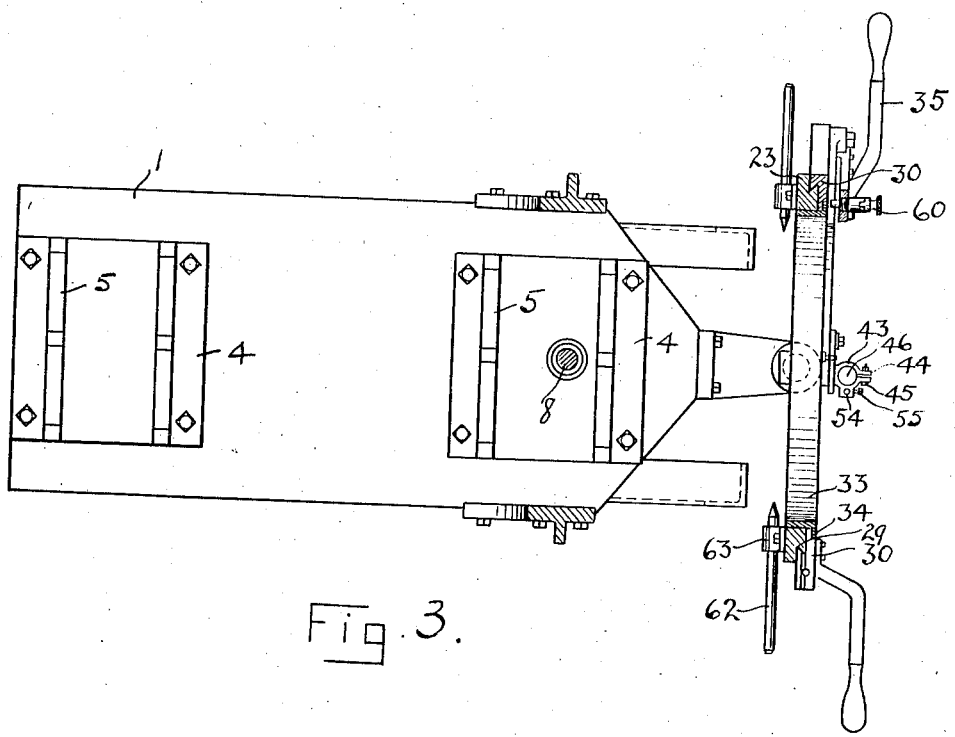
Figure 4:
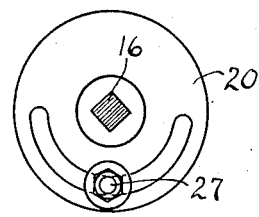

Referring to the drawing, wherein a preferred embodiment of the invention is disclosed, Fig. 1 is a side elevation of the assembled device; Fig. 2 is a front elevation thereof; Fig. 3 is a horizontal section taken on the line 3—3 of Fig. 2; and Fig. 4 is a section on line 4—4 of Fig. 2. Like numerals of reference are employed to designate like parts in all the views.

Our apparatus comprises a table or bench 1 mounted on supporting legs 2 at the rear end, and legs 3 at the forward end. The legs 3 are inclined rearwardly toward the upper ends to provide operating space for the cutter mechanism.

Mounted centrally of the longitudinal axis of the table are two supporting blocks 4, one adjacent the front and one adjacent the rear end of the table. These blocks each have a pair of V-shaped supporting standards 5 thereon to receive the pipe to be cut.

Adjacent the front end of the table is an upright supporting bracket 6 shaped like an inverted U, bolted at the opposite sides of the table. At the upper end of this bracket 6 is a yoke or stand 7 forming at its upper end a ring 9 through which is extended a threaded shaft adapted to be adjusted vertically to raise or lower it in the said ring by means of a hand wheel 10 threaded to said shaft. The lower end of said shaft 8 is not threaded and has a tip or head 12 thereon which is designed to contact with the pipe and clamp it against the blocks 5 and thus hold it securely in position.

The bracket 6 has a forward arm 13 thereon curved upwardly and forwardly at a slight angle and provided with a plate 14 positioned horizontally and having a forward squared notch therein and a cooperating removable block 15 bolted thereon having a similar squared notch fitting against the said plate to form a squared torch ring guide for the post 16.

Said bracket plate 14 has mounted thereon a yoke 17 similar to yoke 7. It has a ring 18 at the upper end through which the threaded upper end of the shaft 16 extends. A hand wheel 19 screwed over the upper end of said shaft acts to adjust said shaft vertically in said yoke.

The lower end of the torch ring guide shaft 16 is secured to a circular horizontal disc 20 which interfits with a lower disc 21, said discs being secured rotatably together and the lower disc being supported upon a shaft 22, the upper end of which is connected to said lower disc. An arcuate slot is formed in the upper disc to receive a set screw 27 on the lower disc which may secure said discs against relative rotation.

The shaft 22 is rigidly secured at its lower end to the torch-supporting ring 23 as shown in Fig. 1, said ring being secured to a similar shaft 24 diametrically opposite the shaft 21 and rotatably supported in a ring plate 25 at the forward end of a lower bracket 26 secured to the forward end of the table 1.

The ring 23 may rotate on the vertical axis provided by the two shafts 22 and 24. The side of the upper disc 20 is marked with a zero point and the lower disc has marginal graduations 28 thereon to indicate the angle through which the ring is rotated.

Said ring 23 is formed with a forward marginal morticed groove 29 thereon upon which is fitted a torch slide ring 30, which for purposes of assembly, is divided diametrically into two parts, and at the points of junction between the said parts it is provided with radially extending flanges 31 at one end and 32 at the other, whereby the two parts may be clamped together. The rear face of the sliding ring 30 is formed with a morticed groove therein to fit over the outer margin of the supporting ring 23, and thus hold the two rings slidably together. On the inner face of the two rings thus assembled is placed a dust shield 33. This shield is a cylindrical sleeve, having on the forward end a marginal flange 34 fitting within a recessed groove on the inner face of the slidable ring 30, and serving to prevent the dust and cuttings from getting between the two rings.

To rotate the slidable ring upon the stationary ring 29, radially extending arms 35 are provided, said arms being bolted, or otherwise secured to the ring 30, as shown at 36. As many of these arms are provided as may be desired for the proper operation of the device.

The blow torch is held in proper relation relative to the pipe to be cut, by means of an arm 37. This arm is a flat plate, pivoted at its outer end at 38 to one of the flanges 32 upon the ring. It extends inwardly and upwardly at an angle to the radius of the ring and its forward end is curved at 39 to fit over the pipe to be cut. The forward end of the arm is provided with an opening through which may extend a bolt or pin 40 by means of which the torch plate 61 may be secured. A second bolt 41, approximately midway of the plate 61 secures the plate 61 to the arm and forms a pivot upon which the plate may be rotated. The bolt 40 fits within an arcuate slot 42 in the plate and allows an angular adjustment of the plate 61 relative to the arm.

The forward end of the plate is formed into a torch holder. This holder is shown particularly in Fig. 3 and comprises a clamping ring 43 provided at its outer side with radially extending flanges 44 which allow a certain amount of clamping action against the torch by means of a bolt or pin 45 extending through said flanges. The central passage 46 through said ring thus forms a holder for an oxyacetylene torch, such as is ordinarily employed in cutting pipe and other metallic structures.

The torch-holding arm 37 fits between the sliding ring 30 and an outer guide plate 48, secured at an angle to the legs 32 upon the ring, and spaced slightly away from the said ring at each end by the structure of the plate. The arm 37 is held resiliently downward toward the pipe, when clamped in position, by means of a spring 49. Said spring is secured about midway of the length of the arm at one end 50, and at the other end is secured at 51 to a pin formed upon the slidable ring.

The arm is held resiliently toward the pipe in the manner just described, and it is found necessary to provide a guide for the forward end of the lever, so as to hold it in proper spaced relation to the pipe which is to be operated upon. For this purpose there is provided a guide, 52. This guide comprises an upright pin 53, adapted to slide through an opening 54 in the torch holder 43, and may be held in adjusted position therein by means of a set screw, 55. The lower end of the said pin 53 is formed with squared head 56, in which is provided an opening 57 for a pivot pin. The guide itself comprises two laterally-extending fingers, 58, secured at their inner ends to a squared block 59 which may register with the opening 56 in the head of the pin 53 and be pivotally connected thereto by means of an attaching bolt or pin 59. As will be noted in Figs. 1 and 2, these guide fingers extend from the pin 52 inwardly to rest on the central crest of the pipe, and are arranged to extend in the direction of the pipe, and thus form a firm support for the forward end of the torch lever 37.

In the use of this device, the arm 37 is thrown upwardly so as to clear the opening through the torch-holding ring, 30. It may be held in this adjusted position by means of a spring pressed pin, 60. This pin extends inwardly over the plate 48 and is adapted to fit within a small opening 61 in the said arm and hold it in elevated position against the action of the spring 49. The pipe is then placed upon the table and clamped in position, resting upon the supports 5 by means of the shaft, 8 and clamping head, 12. When the pipe is thus firmly fixed, extending forwardly through the torch-holding ring, the said ring is rotated on its diametrical axis formed by the shafts 22 and 24, to the proper angle relative to the pipe, the two discs 20 and 21 being graduated so that the proper angle may be observed by the readings on said discs. If it is necessary to raise or lower the torch-holding ring, this may be done by means of the hand wheel, 19, at the upper end of said shaft. The arm 37 may be then released and the action of the spring 49 will bring the guide fingers 58 in a position to rest longitudinally upon the upper crest of the pipe.

In order to direct the torch in a direction always radial relative to the pipe, the torch plate 61 may be adjusted at different angles relative to the arm 37, by means of moving the said plate on its pivot, 41, and then tightly securing it in the proper position by tightening the nut on the pin 40 movable in the slot 42 on the plate. The torch is then clamped in position in the ring 46 of the torch holder with the forward end of the torch midway between the two fingers 58 and spaced slightly from the pipe. The torch is then ignited and the same may be rotated about the pipe by means of the handles or arms 35 upon the slidable ring, carrying the torch around the pipe to sever it completely by one complete rotation of the slidable torch ring 30 upon the stationary ring. As the rings have previously been adjusted at the proper angle relative to the pipe, the pipe will be accurately severed along the exact plane desired. When the cutting has been accomplished the ring may be rotated back into its original position, and will be then ready for another similar operation.

In marking the pipe for cutting operations so that the said pipe may be properly positioned relative to the ring, we have provided a center punch 62 on each side of the pipe. These two punches are arranged diametrically opposite each other and secured in guide plates 63 clamped to the inner face of the stationary ring 23.

The advantages of this type of construction will be readily understood by those skilled in the art. The construction is exceedingly simple and a pipe may be clamped securely in position and marked for cutting, and the torch-holding ring may be set at the angle desired so as to carry the torch in the plane marked about the pipe, and sever it along the line desired. The spring 49 and the guide fingers 58 together, will hold the point of the torch accurately in spaced relation from the pipe so that no attention need be given to the torch itself, the action of the device being practically automatic. It will only be necessary for an operator to rotate the slidable ring, thus carrying the torch in its circuit about the pipe so as to accurately cut the pipe at the angle desired. There are no parts which may be gotten out of order; and when properly calibrated, the device will be exceedingly accurate in its operation.

Having thus described our invention, what we claim as new and desire to protect by Letters Patent is:

1. In a device of the character described, a pipe supporting table, means to clamp pipe thereon, a torch support and guide at the forward end of said table comprising a guide ring pivoted on a vertical axis for adjustment at an angle relative to the pipe, a torch slide ring mounted rotatably on said guide ring, a torch arm on said slide ring, a torch clamp on said arm, means to hold said arm resiliently downward, and guide fingers on said clamp adapted to contact with the pipe and space the torch from said pipe as desired.

2. In a device of the character described, a pipe supporting table, means to clamp pipe thereon, brackets at the forward end of said table, a torch guide ring adapted to fit about the pipe and to swing on an axis to the desired angular position relative to the pipe, a slide ring morticed to said guide pipe and slidable thereon, a torch clamping ring on said slide ring and means to force said clamping means and arm resiliently downward for the purpose described.

3. In a device of the character described, a pipe support, a guide ring thereon through which the pipe is adapted to project, opposite shafts on said ring on which said ring may pivotally turn, a torch slide ring secured slidably on said guide ring, a torch arm pivoted on said slide ring, a torch clamp on the forward end of said arm, and means cooperating with the pipe to hold said torch clamp in uniform spaced relation relative to said pipe.

4. In a device of the character described, a pipe support, brackets thereon, a guide ring journalled in said bracket to swing on a diametrical axis, a torch slide ring secured slidably on said guide ring, an inwardly extending torch arm pivoted on said slide ring, a torch clamp on the forward end of said arm, means to hold said arm inwardly, and means on said arm to guide said clamp and to space it uniformly from the work during operation.

5. In a device of the character described, a pipe support, a guide ring on said support, means to adjust said ring at any desired angle to the work, a sliding support on said guide ring, a torch holder on said support, and means to automatically retain said holder in uniform spaced relation relative to the work, when the distance between said support and said work varies.

6. In a device of the character described, a pipe support, a torch guide ring on said support through which the pipe is adapted to project, means to adjust said ring at the desired angle relative to the pipe, a torch support mounted slidably on said guide ring, a torch clamp on said torch support, a torch rest on said clamp adapted to contact with the pipe, and automatic means to hold said clamp toward the pipe with uniform pressure.

7. In a device of the character described, a pipe support, a torch guide ring on said support having a central opening to receive the pipe, means to adjust said ring at any angle relative to the pipe, a torch support on said guide ring, and slidable thereon, a torch arm on said torch support, a torch clamp adjustably attached to said arm, and means to retain said clamp in uniformly spaced relation to the pipe, when the distance of said ring and said pipe varies.

8. An angle pipe cutter comprising, a pipe clamping means, a torch guide ring, a torch holder on said guide, and means to rotate said holder on said guide in a predetermined path about the pipe, and means to adjust said ring at any desired angle relative to the pipe.

9. In a device of the character described, a torch guide ring, radial shafts on said ring forming an axis upon which said ring may swing, index means on one of said shafts to indicate the angle through which said ring is moved, a torch holder on said ring and means to slide said holder on said ring.

10. In a device of the character described, a torch guide ring opposite radial shafts on said ring forming an axis on which said ring may swing, means to move said shafts and ring in an axial direction and a torch holder slidable around said ring.

In testimony whereof, we hereunto affix our signatures, this 12th day of May, A. D. 1923.

JOHN L. IRVIN.
LEO A. BRAUER.